United States Patent
Gaucher et al.

(10) Patent No.: US 9,665,831 B2
(45) Date of Patent: May 30, 2017

(54) INTERACTIVE LEARNING

(71) Applicant: INTERNATIONAL BUSINESS MACHINES CORPORATION, Armonk, NY (US)

(72) Inventors: Brian P. Gaucher, Brookfield, CT (US); Jonathan Lenchner, North Salem, NY (US); David O. Melville, New York, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 14/523,530

(22) Filed: Oct. 24, 2014

(65) Prior Publication Data

US 2016/0117601 A1    Apr. 28, 2016

(51) Int. Cl.
*G06F 17/00* (2006.01)
*G06F 17/20* (2006.01)
*G06N 99/00* (2010.01)

(52) U.S. Cl.
CPC .................. *G06N 99/005* (2013.01)

(58) Field of Classification Search
USPC ........................................................ 706/11
See application file for complete search history.

(56) References Cited

U.S. PATENT DOCUMENTS

| | | | |
|---|---|---|---|
| 6,353,814 B1 | 3/2002 | Weng | |
| 8,782,529 B2 * | 7/2014 | Grabarnik | G06Q 10/06 715/736 |
| 8,868,516 B2 * | 10/2014 | Laredo | G06Q 10/0637 707/687 |
| 8,972,788 B2 * | 3/2015 | Gschwind | G06F 11/3006 714/25 |

(Continued)

FOREIGN PATENT DOCUMENTS

TW    201123108    7/2011

OTHER PUBLICATIONS

Dual instance and attribute weighting for Naive Bayes classification Jia Wu; Shirui Pan; Zhihua Cai; Xingquan Zhu; Chengqi Zhang 2014 International Joint Conference on Neural Networks (IJCNN) Year: 2014 pp. 1675-1679, DOI: 10.1109/IJCNN.2014.6889572 IEEE Conference Publications.*

(Continued)

*Primary Examiner* — Michael B Holmes
(74) *Attorney, Agent, or Firm* — Tuntunjian & Bitetto, P.C.; Alexa Ashworth (57) ABSTRACT

A system and method are provided for shared machine learning. The method includes providing a model to a plurality of agents included in a machine learning system. The model specifies attributes and attribute value data types for an event in which the agents act. The method further includes receiving agent-provided inputs during an instance of the event. The agent-provided inputs include estimated attribute values that are consistent with the attribute value (Continued)

data types. The method also includes determining expertise weights for at least some agents in response to at least one ground-truth which is learned from the estimated attribute values. The method additionally includes determining an estimate value for one or more of the attributes using respective adaptive mixtures of the estimated attribute values.

9 Claims, 6 Drawing Sheets

(56) References Cited

U.S. PATENT DOCUMENTS

| | | | | |
|---|---|---|---|---|
| 8,984,042 | B2* | 3/2015 | Gschwind | G06F 7/483 |
| | | | | 708/204 |
| 9,081,501 | B2* | 7/2015 | Asaad | G06F 15/76 |
| 9,110,934 | B2* | 8/2015 | Bailey | G06F 17/30289 |
| 9,170,773 | B2* | 10/2015 | Gschwind | G06F 7/483 |
| 9,170,888 | B2* | 10/2015 | Salapura | G06F 11/1415 |
| 9,310,251 | B2* | 4/2016 | Das | G01J 5/0003 |
| 9,310,252 | B2* | 4/2016 | Das | G01J 5/0003 |
| 9,325,703 | B2* | 4/2016 | Kundu | H04L 63/0846 |
| 9,367,384 | B2* | 6/2016 | Kundu | G06F 11/0793 |
| 9,395,622 | B2* | 7/2016 | Inoue | G03F 7/70433 |

OTHER PUBLICATIONS

Signature-based IDS using Boolean Weighted Score multiple classifiers Pornruthai Saelee; Piboonlit Viriyaphol 2012 International Conference on Computer & Information Science (ICCIS) Year: 2012, vol. 2 pp. 706-711, DOI: 10.1109/ICCISci.2012.6297119 IEEE Conference Publications.*

Data acquisition with active and impact-sensitive instance selection X. Zhu; X. Wu 16th IEEE International Conference on Tools with Artificial Intelligence Year: 2004 pp. 721-726, DOI: 10.1109/ICTAI.2004.46 IEEE Conference Publications.*

Self-organizing fuzzy aggregation models to rank the objects with multiple attributes Peijun Guo; H. Tanaka; M. Inuiguchi IEEE Transactions on Systems, Man, and Cybernetics—Part A: Systems and Humans Year: 2000, vol. 30, Issue: 5 pp. 573-580, DOI: 10.1109/3468.867864 IEEE Journals & Magazines.*

Erman, L., et al. "The Hearsay-II Speech-Understanding System: Integrating Knowledge to Resolve Uncertainty." ACM Computing Surveys, vol. 12, Issue 2. Jun. 1980. (41 Pages).

Gelernter, D. "Generative Communication in Linda" ACM Transactions on Programming Languages and Systems, vol. 7, No. 1. Jan. 1985. pp. 80-112.

Huei-Tse, H., et al. "Exploring knowledge sharing discussion behavioural patterns in e-learning communities: a comparison of peer-assessment and problem solving strategy." Intl. J. Cont. Engineering Education and Life-Long Learning. vol. 21, No. 1. pp. 25-41.

Nii, P. "Blackboard Systems" Knowledge Systems Laboratory Departments of Medical and Computer Science, Stanford University, Stanford, California 94305. Jun. 1986. (96 Pages).

Rudd, J, et al. "Education for a Smarter Planet: The Future of Learning CIO Report on Enabling Technologies" IBM Corp. Redguide. Sep. 2009. pp. 1-38.

Sundaram, D., et al. "The Interactive Learning System" Proceedings of the 2004 IEEE Conference on Cybernetics and Intelligent Systems. Dec. 2004. pp. 190-195.

Takeda, K., et al. "Artificial Intelligence: Learning Through Interactions and Big Data" An IBM Redbooks® Point-of-View publication by IBM Academy of Technology. Jun. 2013. pp. 1-6.

Wikepedia "Tuple Space" <http://en.wikipedia.org/wiki/Tuple_space> Sep. 2014. (7 Pages).

Zhang, K., et al. "Interactive Learning of Social Agents Based on Confidence Degree" WCCI 2012 IEEE World Congress on Computational Intelligence. Jun. 2012. (4 Pages).

* cited by examiner

INTERACTIVE LEARNING

BACKGROUND

Technical Field

The present invention relates generally to learning technologies and, in particular, to interactive learning.

Description of the Related Art

The ability for agents to learn and adapt to their environment in a multi-agent machine learning system is a fundamental capability of such a system. It is assumed that the agents are tailored to a particular, repeatable event (e.g., the agents operate in the context of a meeting, a chat session, and so forth) and wish to act in some optimal fashion. Given what the agents are able to view of the event as it evolves, agents are tasked with predicting an optimal course of action.

Rather than reacting ab initio each time the event is repeated, the agents would benefit from building up a reservoir of experience from which they are capable of learning. Machine learning is an esoteric and difficult to use technology so that independently building separate agents that implement learning systems in their own way is especially cumbersome. For analogous reasons, creating a shared learning environment has remained elusive. What is needed is an interactive learning capability such that one could create and train a generic, non-task-specific, learning system for a given user, or set of users, that could then be accessed (and contributed to) by other, more task-specific, agents, systems or applications.

SUMMARY

According to an aspect of the present principles, a method is provided for shared machine learning. The method includes providing a model to a plurality of agents included in a machine learning system. The model specifies attributes and attribute value data types for an event in which the plurality of agents act. The method further includes receiving agent-provided inputs from the plurality of agents during an instance of the event. The agent-provided inputs include estimated attribute values that are consistent with the attribute value data types. The method also includes determining expertise weights for at least some of the plurality of agents in response to at least one ground-truth which is learned from the estimated attribute values. The method additionally includes determining an estimate value for one or more of the attributes using respective adaptive mixtures of the estimated attribute values.

According to another aspect of the present principles, a machine learning system having a plurality of agents is provided. The system includes a model manager for providing a model to the plurality of agents. The model specifies attributes and attribute value data types for an event in which the plurality of agents act. The system further includes an agent input sub-system for receiving agent-provided inputs from the plurality of agents during an instance of the event. The agent-provided inputs include estimated attribute values that are consistent with the attribute value data types. The system also includes a ground-truth-based expertise weighting determiner having a processor for determining expertise weights for at least some the plurality of agents in response to at least one ground-truth which is learned from the estimated attribute values. The system additionally includes an adaptive attribute value mixer for determining an estimate value for one or more of the attributes using respective adaptive mixtures of the estimated attribute values.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to interactive learning. Advantageously, the present principles are capable of being deployed in a multi-agent, interactive machine learning environment where information is shared amongst the various agents. As used herein, the terms "interactive machine learning" or "shared machine learning" interchangeably refer to a system that can learn from data in an interactive way such that agents of the system can integrate their acquired knowledge using a shared model.

In an embodiment, the present principles advantageously can be applied to a set of agents working together in a common environment, but with possibly disparate objectives. In such a case, the present principles provide an infrastructure for the agents to integrate their acquired knowledge in such a way that it is usable and useful to the other agents.

For example, in an embodiment relating to an intelligent meeting room, the present principles provide an infrastructure such that the various agents can create, contribute to, and leverage shared models of the meeting participants, the meeting itself, and anything else that might be of mutual interest to the agents. In addition, as new agents discover new models of interest and new aspects of an existing model(s), these new models and model aspects can be seamlessly integrated into the shared infrastructure.

There are various entities in an environment in which a set of agents act. These entities may be real physical objects (e.g., people attending a meeting), or abstract concepts (e.g., attentiveness of the people attending the meeting), whose deep understanding may benefit one or more of the agents. Exemplary entities include the people in an environment ("real" objects), and the degree of teaming that is going on in the environment (an abstract concept or conceptual entity). If an agent's job is to deliver just-in-time information to the people in the environment, it would be useful for the agent to know, for example, where a given person is glancing to help in most effectively delivering the message.

Analogously, a meeting facilitator agent might benefit from understanding the degree of teaming/other form of cooperation that is taking place in a meeting in order to play a more or less active role.

In an embodiment, the present principles can be applied to a scenario where the number and range of agents participating in the system are not strictly controlled, and the notion of what is being modeled and how the modeling is to be done is not entirely fixed and agreed upon in advance. Moreover, the present principles advantageously provide an extensible model contract, where models, attributes and attribute values can be dynamically added, and attributes as well as attribute values can be used in or as supersets and subsets. Further, the present principles advantageously provide the use of surrogate oracles, where by selective replacement N-1 agents act like an oracle for estimating the veracity of a current (or "Nth") agent under evaluation.

Thus, the present principles advantageously provide a shared learning paradigm that can be used by a set of agents to collectively leverage each other's insights. The model is initially specified as a set of attributes and values that will jointly be estimated by the respective agents. A given environment may include one or more models. For example, in the context of the meeting room application mentioned above, there are naturally at least three models as follows: (i) a model of individual participants (e.g., Are the individual participants happy, tired, bored, nervous, excited, attentive, and so forth?); (ii) a model of the group (e.g., Is the group getting along, doing a good job of turn-taking, and so forth?); and (iii) a model of the meeting as a whole (e.g., Does it have an agenda? If so, is it following the agenda? Does the meeting have goals? If so, is it meeting the goals? Etc.).

In any given model, agents may estimate the values of some subset of the attributes along with their confidence in their reported values of these attributes. They may also extend the set of attributes and extend the set of admissible values for a given attribute. Agents may also declare a final value set for a given attribute, in which case the value set cannot continue to be modified.

An additional, specialized agent (a "shared model manager agent"), manages the shared models, and produces estimates of the values of the attributes using an adaptive mixture of experts approach. Although adaptive mixture of experts systems exist, to date, they have only been applied in cases where the set of attributes and admissible values are known ahead of time. In accordance with the present principles, the first example of an open architecture is provided that uses the adaptive mixture of experts approach while allowing the sets of attributes, values, and experts to continually evolve.

These and other features of the present principles as well as other applications to which the present principles can be applied, are readily determined by one of ordinary skill in the art, given the teachings of the present principles provided herein, while maintaining the spirit of the present principles.

Figure 1:
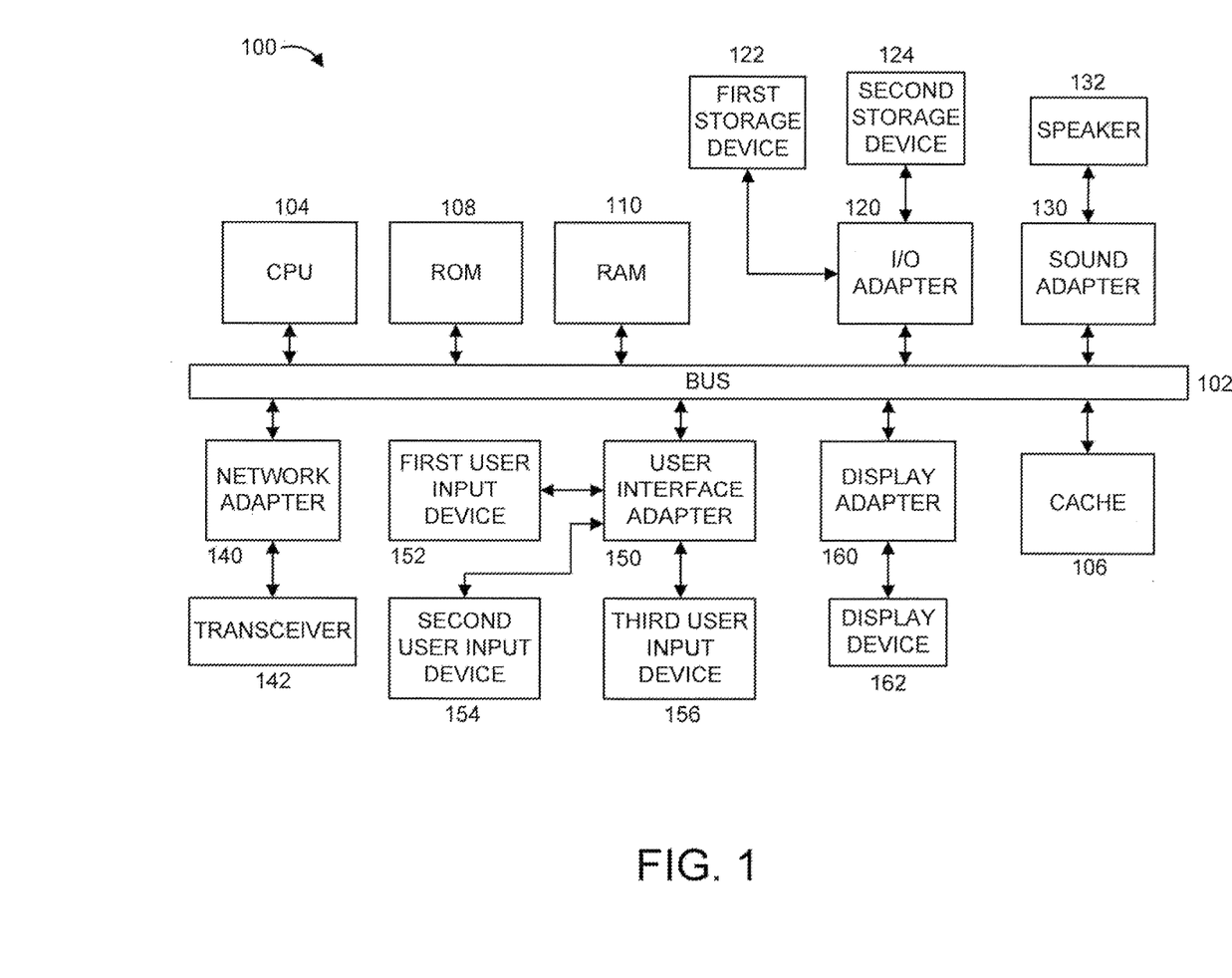
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
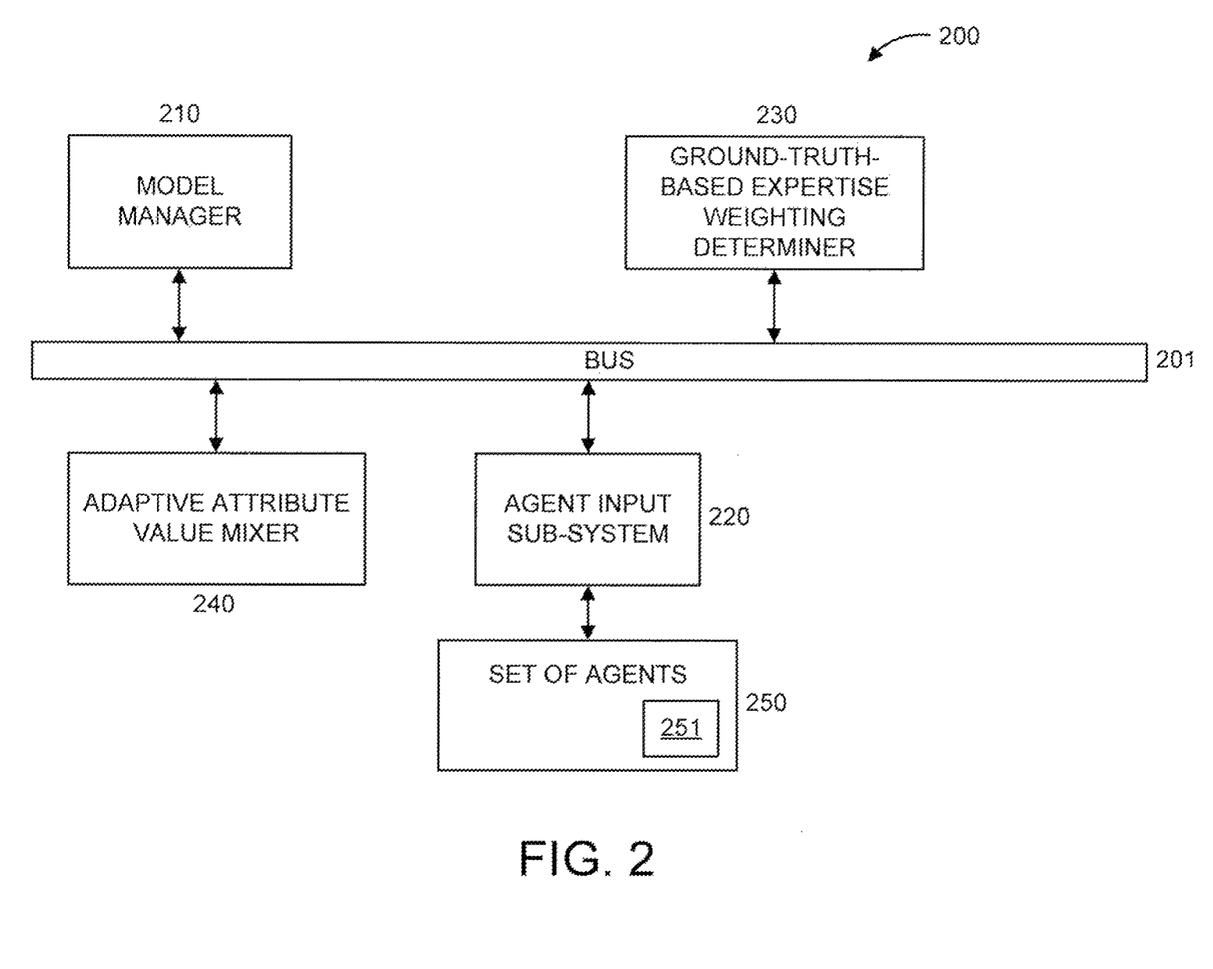
FIG. 2 shows an exemplary multi-agent, interactive machine learning system 200, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
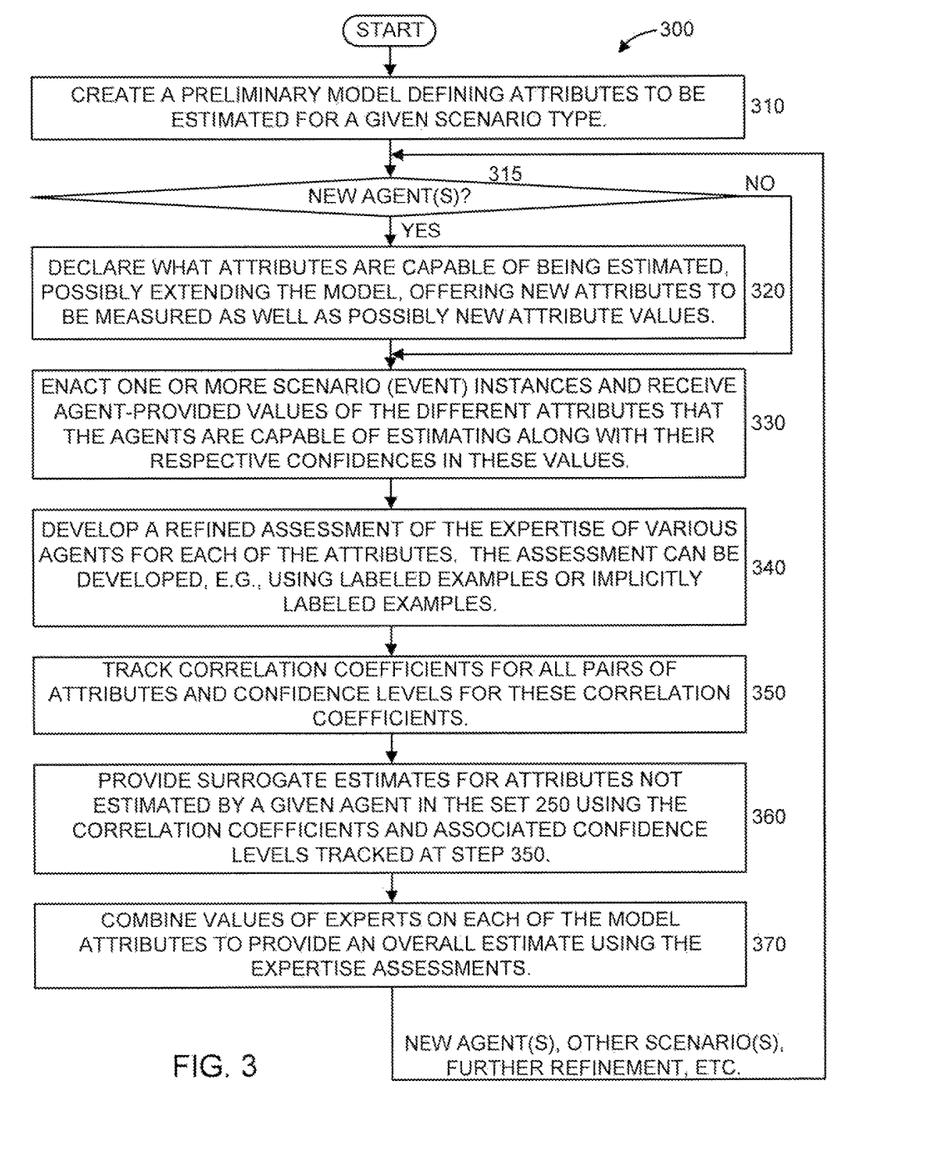
FIG. 3 shows an exemplary method 300 for multi-agent, interactive machine learning, in accordance with an embodiment of the present principles.

Further, it is to be appreciated that processing system 100 may perform at least part of the method described herein including, for example, at least part of method 300 of FIG. 3. Similarly, part or all of system 200 may be used to perform at least part of method 300 of FIG. 3.

FIG. 2 shows an exemplary multi-agent, interactive machine learning system 200, in accordance with an embodiment of the present principles. The system 200 can be, but is not limited to, being applied to meet a user's or group of users' needs in the context of a repeatable event in which the agents act. The event can be, for example, but is not limited to, a meeting, a car ride, the composing of an email or SMS message, and so forth. These and other events to which the present principle can be applied are readily determined by one of ordinary skill in the art given the teachings of the present principles provided herein, while maintaining the spirit of the present principles.

In an embodiment, the system 200 includes a model manager 210, an agent input framework/sub-system (hereinafter "agent input sub-system") 220, a ground-truth-based expertise weighting determiner 230, an adaptive attribute value mixer 240, and a set of agents 250. In an embodiment, some of the elements of system 200 are interconnected by a bus 201. However, other interconnections can also be used, while maintaining the spirit of the present principles.

A model manager 210 manages a model used by the agents. In an embodiment, the model manager 210 can also initially create the model, which is then subsequently modified by the agents during an instance(s) of a repeatable event in which the agents act. In an embodiment, the model specifies a set of attributes and data types of the attribute values. The set of attributes and their respective values model the repeatable event, as they directly relate to the repeatable event and describe particular characteristics of the repeatable event. In an embodiment, the model can further specify a range of admissible values for some of the attributes. The range of admissible values are dependent upon the application and can be numerically-based (e.g., if one aspect of the model includes gauging the degree of engagement of the various participants in a meeting, the values can range from, e.g., 1 to 10) or have some other basis (e.g., if an aspect of the model gauges whether or not each meeting participant is looking at the current speaker such an attribute can take on possible values of true or false). The model manager 210 makes the model available to, and extensible by, all agents in the system 200. In an embodiment, the model is embodied in a document, such as a JavaScript Object Notation (JSON) document or an eXtensible Markup Language (XML) document. In an embodiment, the document is accessible by the agents, for consultation thereof, and extension thereby. The access can be provided via any type of communication system, as readily appreciated by one of ordinary skill in the art. However, while described herein as a document in one embodiment, the model can take on other forms such as other types of data structures and so forth, as readily appreciated by one of ordinary skill in the art, while maintaining the spirit of the present principles.

An agent input sub-system 220 accepts inputs from the various agents during an instance of a repeatable event. The inputs can include, but are not limited to, for example, agent-provided values of some subset of the attributes of the model and optionally their confidence in these values. The inputs can be steadily streamed from the agents to the system 200, streamed with a lesser frequency (than steadily), or returned only upon request from the system 200. Exemplary forms of the agent input sub-system 220 can include, but are not limited to, for example, a publish and subscribe system, a token passing system, a REST-based request/response system, or any of a myriad of other messaging systems. For example, if an agent is continually transmitting the location of each participant in a meeting, in a precise 3D coordinate system, it will likely publish this data over a publish and subscribe channel since the data may change at a fairly high rate.

A ground-truth-based expertise weighting determiner 230 learns some degree of ground-truth in the attribute values using, for example, examples labeled by actual subjects/participants (e.g. in the meeting room embodiment), examples labeled by surrogate subjects (e.g., by human experts watching/listening to a recording of one or more of the repeatable events), and/or by using unlabeled examples and a surrogate oracle including the votes of the other N-1 agents when assessing the expertise level of agent #N (and thus creating a "pseudo-labeling"). The learned ground-truths are then used to determine expertise weights for the various agents in the set. As is known, ground truth refers to the accuracy of a classification for a learning technique and as applied herein refers to the accuracy of the attribute values determined by the agents.

An adaptive attribute value mixer 240 develops an attribute-by-attribute adaptive mixture of experts that uses maximum likelihood methods to optimize the probability of selecting the correct, or as close as possible to correct, label for each attribute.

The set of agents 250 can include two or more agents. In an embodiment, the set 250 includes a shared model manager agent 251 that performs the functions described herein.

FIG. 3 shows an exemplary method 300 for multi-agent, interactive machine learning, in accordance with an embodiment of the present principles.

At step 310, create a preliminary model defining attributes to be estimated for a given scenario type (e.g., a meeting, and so forth). In an embodiment, the model manager 210 performs step 310.

At step 315, it is determined whether or not any new agents have entered the system. If so, the method continues to step 320. Otherwise, the method continues to step 330.

At step 320, declare what attributes are capable of being estimated, possibly extending the model, offering new attributes to be measured as well as possibly new attribute values. In an embodiment, the set of agents 250 performs step 320. In an embodiment, step 320 can involve consulting a data structure that specifies pre-known capabilities of the various agents in the set 250.

At step 330, enact one or more scenario (i.e., event) instances and receive agent-provided values of the different attributes that the agents are capable of estimating along with their respective confidences in these values. In an embodiment, the agent input framework/sub-system 220 receives the agent-provided values of the different attributes. The event instances can be instantiated by the system 200 or another system to which system 200 is capable of interfacing with for the purposes of the present invention, as described herein.

At step 340, develop a refined assessment (e.g., gradually refined) of the expertise of various agents for each of the attributes. In an embodiment, the assessment can be developed, for example, using labeled examples or implicitly labeled examples (e.g., using N-1 substitution methods). In an embodiment, the shared model manager agent 351 performs step 340.

At step 350, track correlation coefficients for all pairs of attributes and confidence levels for these correlation coefficients. In an embodiment, the shared model manager agent 351 performs step 350.

At step 360, provide surrogate estimates for attributes not estimated by a given agent in the set 250 using the correlation coefficients and associated confidence levels tracked at step 350. In an embodiment, the shared model manager agent 251 performs step 360.

At step 370, combine values of experts on each of the model attributes to provide an overall estimate using the expertise assessments. Hence, in an embodiment, the "overall estimate" for a given attribute represents a value determined from combining values of multiple experts for that given attribute. In an embodiment, the adaptive attribute value mixer 240 performs step 370.

The system continuously refines its adaptive mixture of experts model. An expert that is good for a time may get worse, or one that initially does poorly may suddenly get much better. New attributes may come up. New agents may start contributing to the system. New scenarios may come up. Thus, step 370 is shown returning to step 315 after an iteration. As is readily appreciated by one of ordinary skill in the art, applicable ones of steps 315 through 370 are iteratively performed to account for one or more conditions/reasons including further refinement, new agents introduced into the system, different (e.g., changing) agent capabilities, new scenarios, and so forth.

Further regarding step 310, and in the context of the meeting room example mentioned above, some exemplary attributes in addition to those mentioned above can include, but are not limited to: (1) the degree of engagement of a given meeting attendee in the meeting, or (2) how happy the meeting attendee is with the direction in which the meeting is headed.

Further regarding steps 320 and 330, the preceding exemplary attributes could be estimated by a couple of different agents, e.g. one that listens to the tone of voice of the participants and the amount of time they are speaking, and another that looks at video to detect facial expressions.

Further regarding step 340, labeled examples refer to cases where either (i) the individuals in the meeting give some ground truth after the meeting about their levels on these attributes at each point or certain points in time during the meeting, or (2) a human looks at the video transcript of the meeting and makes these assessments. The N-1 substitution method is a weaker method, where the labeling of one agent is compared with the aggregate (averaged) weighting of the N-1 other agents to assess how good each agent is at predicting an attribute value. A "wisdom of the crowds" assumption is made and the average of the other agents' assessment can carry some authority in determining ground truth.

A description will now be given of an exemplary implementation of the present principles, in accordance with an embodiment of the present principles.

First a model is specified, for example, in a convenient markup language, as a set of attributes, data types of the attribute values, and, optionally, a range of admissible values for some of the attributes. The model is shared with all agents in the system and viewed as an evolving, shared contract. In an embodiment, a model is a representation of an entity as described above.

Next, as agents start participating in the learning framework, they start providing estimates for the attribute values which constitute the model, and, optionally, estimates of their confidence in their provided attribute values. Many, if not most, agents will be specialized and hence not able to estimate all attributes. Agents can also, at any time, extend the model by adding attributes or by adding admissible attribute values to attributes.

An independent shared model manager agent then takes a confidence-weighted average of the "votes" of all agents. For categorical attributes, in an embodiment, the attribute value with the highest weighted vote count wins out. For numerical data, in an embodiment, the confidence-weighted mean wins out. For non-linearly scaled attributes, in an embodiment, a special scaling can be applied. Of course, other approaches can be used for categorical attributes, numerical data, and non-linearly scaled attributes. Over time, as the system learns some ground-truth, or approximate ground truth, and degrees of trustworthiness can be assigned to the various experts, the system comes up with expertise weightings using maximum likelihood methods which can then be combined with the agents' own confidences in a multiplicative fashion.

Expertise weightings can be learned in a variety of ways. Some exemplary ways for learning expertise weighting include, but are not limited to, the following: (i) users can be given questionnaires to answer, perhaps throughout the course of the meeting or other event in which the agents act; (ii) a recording of the event can be taken and a human expert can assign attribute values which can be taken as an approximate ground truth; (iii) users can be given real-time feedback on the beliefs of the agents that can be corrected; (iv) in a variant of (i) users may be given quizzes or simple games to determine attribute values; and (v) the weighted opinion of the other N-1 experts may serve as an "approximate oracle" for grading the estimates of a given Nth agent.

We now describe some considerations relating to the models described herein. For example, in the simplest approach to thinking about such a model, we may assume that all attributes are independent of one another, namely the so-called naive Bayes assumption. However, if we consider the set of sample attributes we listed for modeling an individual participant in a meeting (e.g., are the individual participants happy, tired, bored, nervous, excited, attentive, and so forth), we notice that the attributes are not at all independent. Thus one agent may give an estimate of a meeting participant's degree of boredom but not their attentiveness, while another agent may give an estimate of an individual's attentiveness but not their boredom level. These two attributes clearly have a high degree of negative correlation so that an assessment of one gives a rough estimate of the other. Understanding all conditional probabilities will therefore enable a given agent's assessment of a subset of the attributes to indirectly provide values for other attributes, though normally with a higher degree of uncertainty, i.e., with lower implicit confidence.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
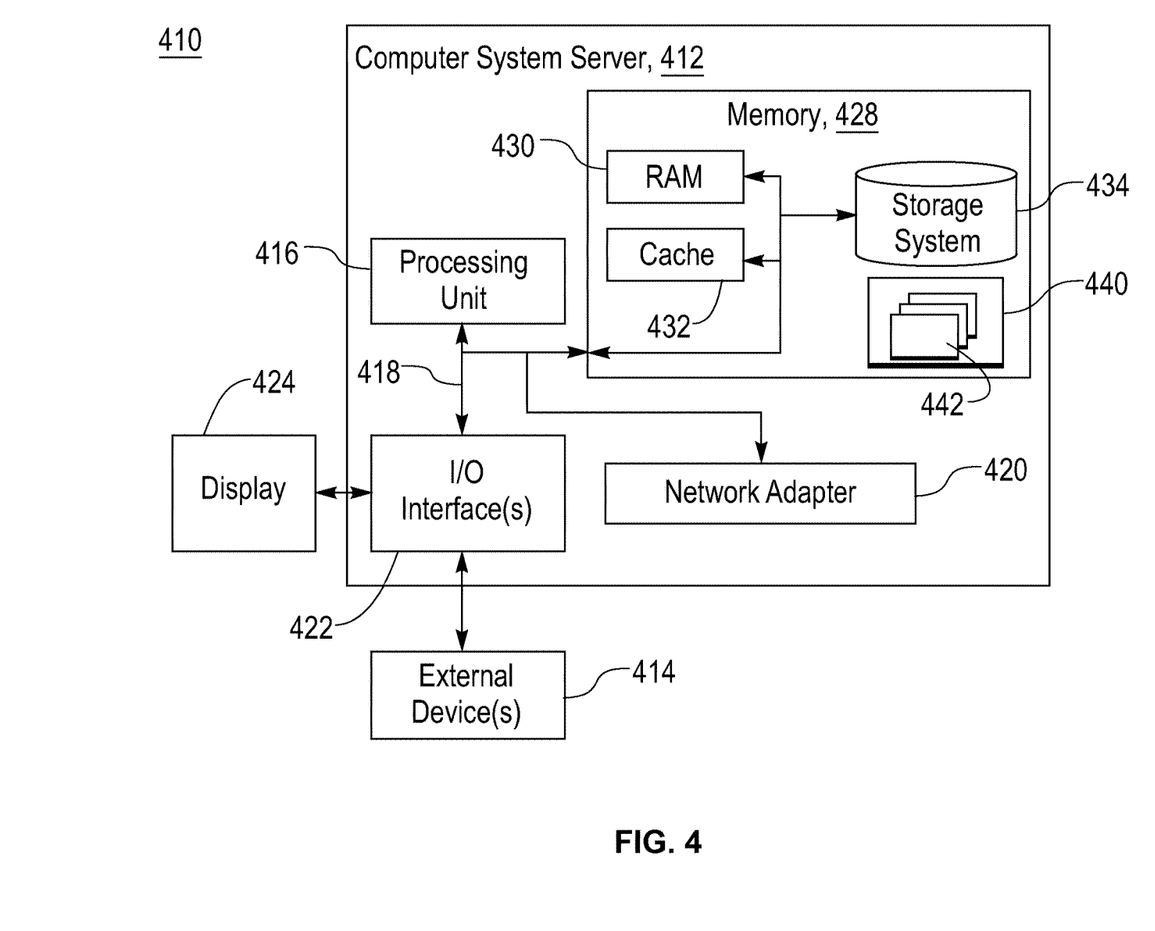
FIG. 4 shows an exemplary cloud computing node 410, in accordance with an embodiment of the present principles.

Referring now to FIG. 4, a schematic of an example of a cloud computing node 410 is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
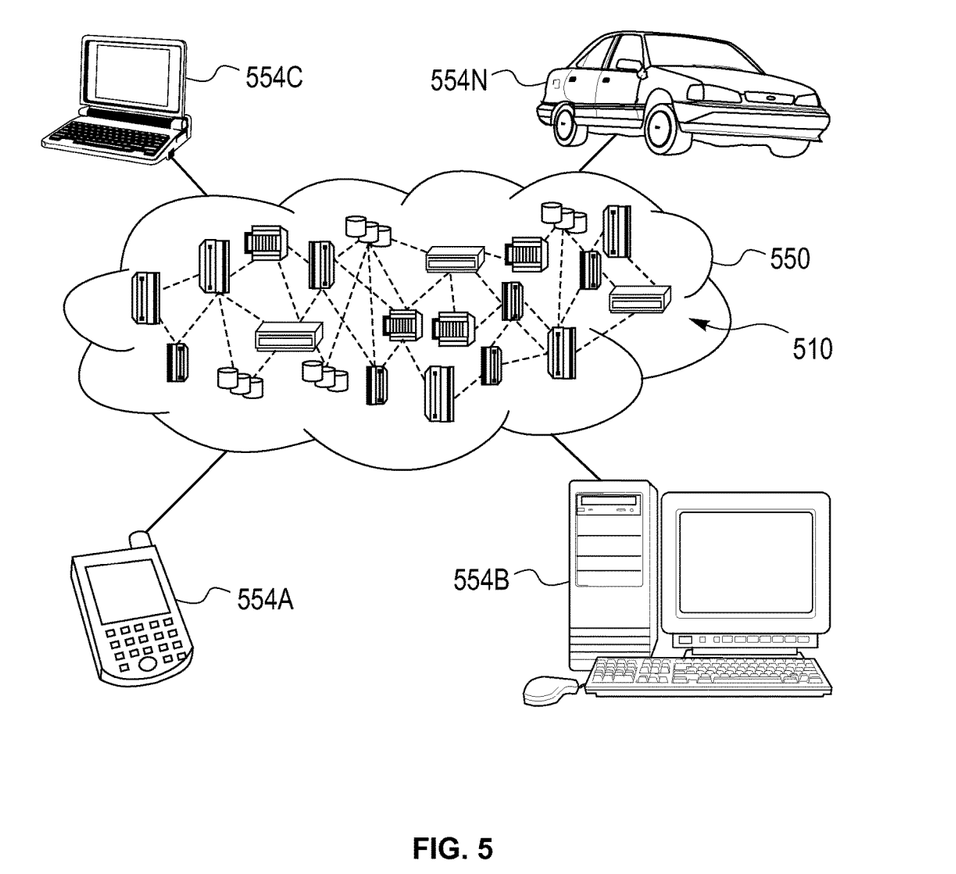
FIG. 5 shows an exemplary cloud computing environment 550, in accordance with an embodiment of the present principles.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
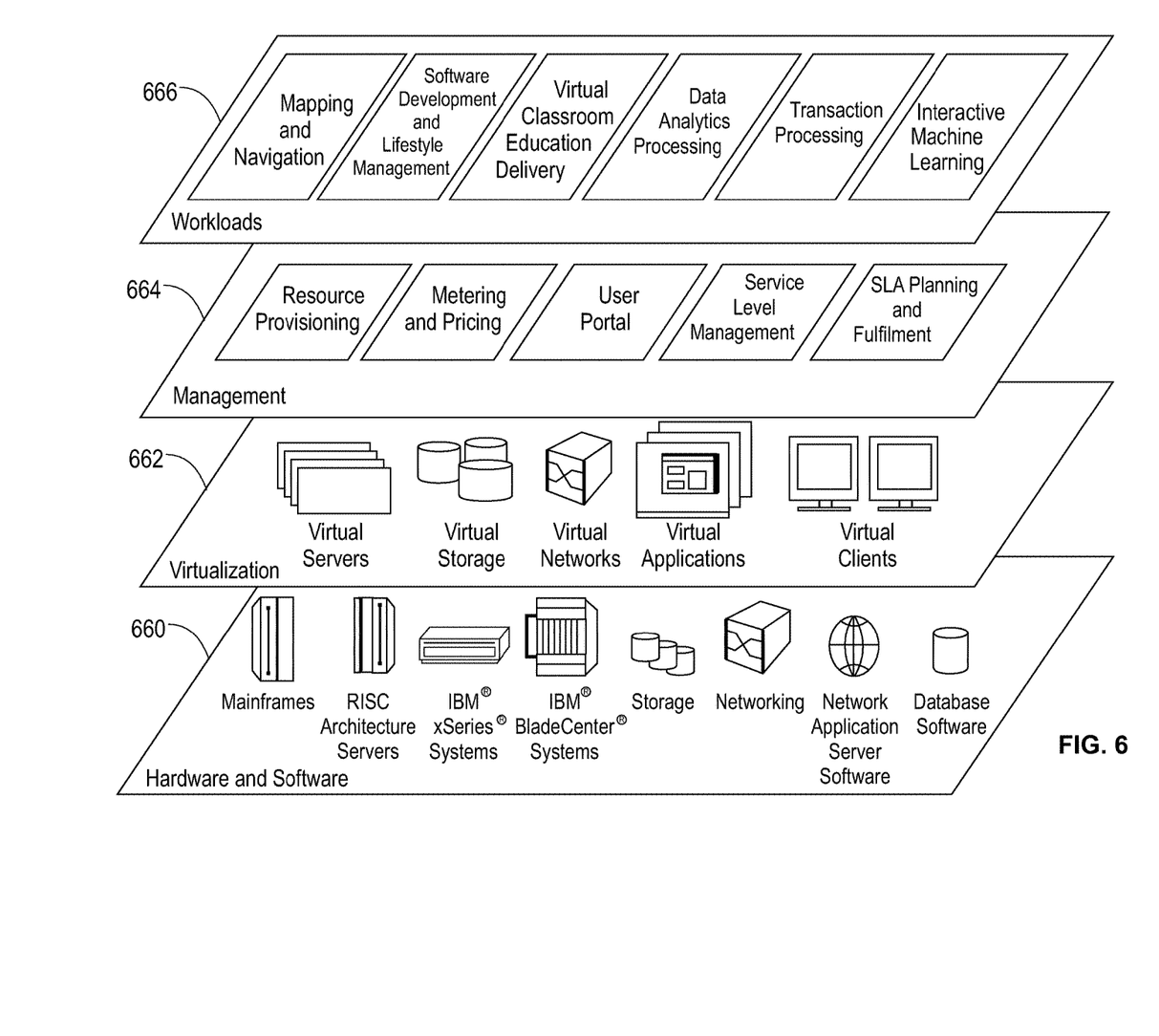
FIG. 6 shows exemplary abstraction model layers, in accordance with an embodiment of the present principles.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and interactive machine learning.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A machine learning system having a plurality of agents, the system comprising:
   a model manager for providing a model to the plurality of agents, the model specifying attributes and attribute value data types for an event in which the plurality of agents act;
   an agent input sub-system for receiving agent-provided inputs from the plurality of agents during an instance of the event, the agent-provided inputs include estimated attribute values that are consistent with the attribute value data types;
   a ground-truth-based expertise weighting determiner having a processor for determining expertise weights for at least some the plurality of agents in response to at least one ground-truth which is learned from the estimated attribute values; and
   an adaptive attribute value mixer for determining an estimate value for one or more of the attributes using respective adaptive mixtures of the estimated attribute values.

2. The system of claim 1, wherein the model further specifies a respective range of admissible values for at least some of the attributes.

3. The system of claim 1, wherein the agent-provided inputs further include confidence values for the estimated attribute values.

4. The system of claim 1, wherein the respective adaptive mixtures are determined on an attribute-by-attribute basis responsive to the expertise weights and the confidence values.

5. The system of claim 1, wherein the ground-truth-based expertise weighting determiner learns the at least one ground-truth responsive to labeled examples of ground truths, each of the labeled examples corresponding to a particular attribute value for a particular one of the attributes.

6. The system of claim 5, wherein the labeled examples comprise at least one of actual subject labeled examples and surrogate subject labeled examples.

7. The system of claim 5, wherein the ground-truth learning sub-system learns the at least one ground-truth using an N-1 substitution method, wherein a ground truth label for an estimated attribute value for a respective one of the attributes provided by a respective one of the plurality of agents is compared to ground truth labels for the estimated attribute values for the respective one of the attributes provided by remaining ones of the plurality of agents to assess an ability of the respective one of the plurality of agents at estimating a value for the respective one of the attributes.

8. The system of claim 1, wherein a shared model manager agent from among the plurality of agents provides surrogate estimated attribute values for respective ones of the plurality of agents that fail to provide a respective estimated attribute value for one or more of the attributes using correlation coefficients for pairs of the attributes and confidence levels for the correlation coefficients.

9. The system of claim 1, wherein a shared model manager agent from among the plurality of agents learns prior probabilities for pairs of the attributes and generates, responsive to the prior probabilities, surrogate assessments and surrogate confidence levels for respective ones of the plurality of agents that fail to produce certain attribute values but produce other attribute values for which there are well established prior probabilities.

* * * * *